(12) United States Patent
Gascon

(10) Patent No.: US 11,907,596 B1
(45) Date of Patent: Feb. 20, 2024

(54) VARIABLE DATA PRINTING PIPELINE FOR DIGITAL PRINTING

(71) Applicant: BOBST MEX SA, Mex (CH)

(72) Inventor: Gregory Gascon, Duillier (CH)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 18/337,599

(22) Filed: Jun. 20, 2023

(51) Int. Cl.
*G06F 3/12* (2006.01)
*G06T 1/20* (2006.01)

(52) U.S. Cl.
CPC .......... *G06F 3/1243* (2013.01); *G06F 3/1208* (2013.01); *G06F 3/1257* (2013.01); *G06T 1/20* (2013.01); *G06F 2211/007* (2013.01)

(58) Field of Classification Search
CPC .... G06F 3/1243; G06F 3/1208; G06F 3/1257; G06F 2211/007; G06T 1/20
USPC ................................. 358/1.2, 1.15
See application file for complete search history.

(56) References Cited

U.S. PATENT DOCUMENTS

| 7,091,985 B1 | 8/2006 | Towns et al. | |
| 7,092,117 B2 * | 8/2006 | Kageyama | G06K 15/02 358/1.18 |
| 2004/0151372 A1 | 8/2004 | Reshetov et al. | |
| 2008/0144952 A1 | 6/2008 | Chen et al. | |
| 2016/0170696 A1 * | 6/2016 | Meng | G06F 3/1208 358/1.18 |
| 2021/0273929 A1 | 9/2021 | Bernat et al. | |

FOREIGN PATENT DOCUMENTS

JP 2011076156 A 4/2011

* cited by examiner

*Primary Examiner* — Kent Yip
(74) *Attorney, Agent, or Firm* — Bookoff McAndrews, PLLC

(57) ABSTRACT

The present invention generally relates to a method for variable data printing. A data set of compressed data is provided. The data set corresponds to a basic image layout comprising a plurality of dots. Using at least one general purpose computation on graphics processing unit the compressed data is decompressed to obtain decompressed data corresponding to the basic image layout. To each dot of the plurality of dots of the basic image layout a color value is assigned based on a reference entry of a color lookup table such that a decompressed first customized image layout to be printed is obtained. The decompressed first customized image layout is provided to at least one printer device. At least the decompressed first customized image layout is printed. The at least one printer device continuously prints subsequent decompressed customized image layouts at a predefined minimum printing speed.

13 Claims, 1 Drawing Sheet

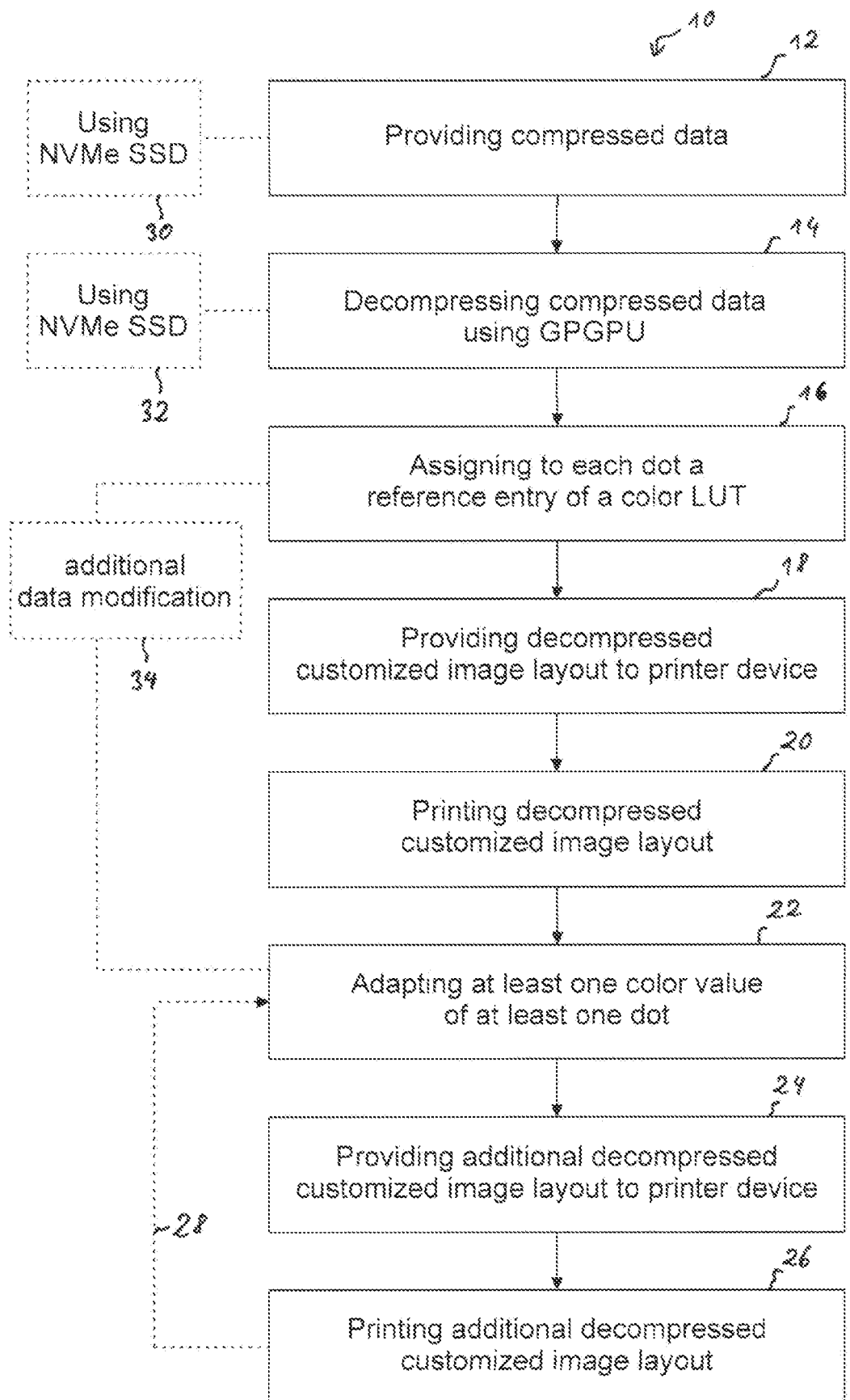

VARIABLE DATA PRINTING PIPELINE FOR DIGITAL PRINTING

CROSS-REFERENCE TO RELATED APPLICATION(S)

This patent application claims the benefit of priority to European Application No. 22180077.4, filed on Jun. 21, 2022, the entirety of which is incorporated herein by reference.

FIELD OF THE DISCLOSURE

The present invention generally relates to a method for variable data printing.

BACKGROUND

In modern printing services the data size is so large that continuous printing at maximum printing speeds of the underlying printing devices is problematic. The reasons for this are manifold.

Firstly, the resolution of the layouts to be printed is ever increasing such that the data size increases as well and, therefore, is challenging to handle. For example, storing and reading speeds with regard to the respective data may cause interruptions and degrade the achievable printing speed.

Secondly, processing the data may degrade the achievable printing speed as well, especially if the layouts to be printed vary during the ongoing printing process. Such variation is known e.g. for variable data printing processes during which the layout to be printed is modified so as to represent different printing layouts. The variation of the underlying printing layout requires in-time data modification processes to be executed such that no interruption of the printing process is caused. It is known to apply conventional data processing devices for varying the data during the ongoing printing process. However, the achievable printing speeds as well as the degree of possible variations of the image layouts are limited in this case from the modification point of view but as well from the data handling (storing and reading) point of view.

Accordingly, there is need for a method which allows improved printing speeds to be achieved. Preferably, the improved printing speeds may even be obtained during printing processes for which the underlying data are varied during the ongoing printing process, i.e. for variable data printing processes.

SUMMARY

The subject matter of the independent claim satisfies the respective need. Preferred embodiments are indicated within the dependent claims and the following description, each of which, individually or in combination, may represent aspects of the disclosure.

A summary of certain embodiments disclosed herein is set forth below. It should be understood that these aspects are presented merely to provide a brief summary of these certain embodiments and that these aspects are not intended to limit the scope of this disclosure. This disclosure may encompass a variety of aspects that may not be set forth below.

According to an aspect, a method for variable data printing (VDP) is provided. The method comprises at least the following steps:

A data set of compressed data is provided. The data set corresponds to a basic image layout. The basic image layout comprises a plurality of dots (step A).

Using at least one general purpose computation on graphics processing unit (GPGPU), the compressed data is decompressed to obtain decompressed data corresponding to the basic image layout (step B).

To each dot of the plurality of dots of the basic image layout a color value based on a reference entry of a plurality of reference entries of a color lookup table (LUT) is assigned such that a decompressed first customized image layout to be printed is obtained. Each reference entry of the color LUT corresponds to a color value of a palette of color values to be used (step C).

The decompressed first customized image layout is provided to at least one printer device (step D).

At least the decompressed first customized image layout is printed (step E).

For at least one dot of the plurality of dots of the basic image layout the color value is adapted to obtain at least one additional decompressed customized image layout to be printed (step F).

The at least one additional decompressed customized image layout is provided to the at least one printer device (step G).

The at least one additional decompressed customized image layout is printed at a predefined printing speed (step H).

The at least one printer device continuously prints subsequent decompressed customized image layouts at a predefined minimum printing speed. The minimum printing speed is larger than 20 m/min. Preferably, the minimum printing speed is at least 40 m/min. More preferably, the minimum printing speed is at least m/min. More preferably, the minimum printing speed is at least 100 m/min.

The so designed method provides several advantages. The data set is initially provided in a compressed fashion. Therefore, data transfer and storage expenses and the load on the respective communication devices are reduced. In addition, GPGPU infrastructures show advantageous properties when handling large data sets. In particular, compared to traditional common central processing circuits, GPGPU devices guarantee that the decompression procedure may be performed at shorter time scales such that the overall printing speed can be improved. Moreover, the GPGPU device shows also improved data handling properties. A memory assigned to the GPGPU device may be accessed at very short time scales such that the underlying writing and reading speeds when adapting the data with regard to the underlying color value of the at least one dot to achieve different customized image layouts are improved. Consequently, improved printing speeds are achievable even if the data specifying the color values of the different dots are modified during the procedure so as to provide VDP capabilities. The achievable printing speeds are maintained without interruptions of the printing process such that the printing efficiency is improved compared to existing VDP printing procedures which apply traditional central processing circuits.

Within the present context, VDP may be considered a specialized type of digital printing, wherein during the ongoing printing procedures portions of the layout to be printed are adapted with regard to at least one property, such as a color value.

Within the present context, a data set may be regarded as a closed set of data belonging together, such as a single or multiple data files, a data base or the like.

Within the present context, compressed data may be considered data or data files which are reduced in size compared to the respective decompressed data. Data compression is usually performed using a data compression algorithm. The algorithm may apply lossless or lossy data compression techniques.

Within the present context, the basic image layout can be considered an image which includes at least one portion which is intended to be customized so as to obtain customized image layouts. In other words, the basic image layout may relate to a rather general layout of the underlying image, such as a layout suitable for printing a packaging material. However, since the devices contained in separate packages may be different from each other, e.g. with regard to a color or a serial number, such different information may be adapted such that different customized image layouts are achieved from the general basic image layout. Also, of course specific image portions of the image layout may be different between different customized image layouts, e.g. due to different colors, graphical features or the like.

Put differently, the basic image layout is to be considered to represent an individual image having full dimensions to be printed. Therefore, the basic image layout does not represent only a portion (fraction) of the entire image to be printed from a dimension point of view. This means that the present method does not utilize pipelining techniques based on dividing the image into several tiles where upon subsequent printing steps the tiles or the underlying color values of dots contained within the tiles are altered. Rather, the present method makes use of treating the entire image based on the basic image layout at once, while the color value of at least dot contained therein is adapted so as to achieve a customized image layout. However, like the basic image layout the customized image layout represents an image having full dimensions and not being split up into several tiles.

A tile based printing method utilizes a pipelining architecture which is avoided in the present case. Therefore, the present method makes use of the finding that using the whole image to be printed (from a dimension point of view) provides for higher compression rates to be achievable by avoiding replicas in the color palette which are required when splitting up the image to be printed into tiles and using a pipelining architecture. In contrast, the present method considers the entire image to be printed at every printing step and uses a palette of color values as well as reference entries assigned to each dot establishing an assignment map. Between different printing steps, at least one or both of the palette of color values and the reference entries may then be independently lossless compressed with a block-based algorithm.

Within the present context, a general purpose computation on graphics processing unit (GPGPU) may be considered a graphics processing circuit which allows parallel processing to be performed. Thereby, processing of the data may be parallelized. The GPGPU generally comprises a larger number of cores compared to traditional central processing units (CPUs) such that the speed of processing graphics, image data, and data in general is improved.

Within the present context, a dot can be considered the basic printing portion of the basic image layout which comprises a plurality of dots defined by the underlying resolution usually expressed in dpi. Sometimes, properties of the basic image layout are discussed in view of pixels. However, pixels rather relate to a graphical image displayed by a display device.

Within the present context, the color lookup table (LUT) may be considered a collection of color values which is to be applied in view of the dots of the customized image layouts. The entire collection of color values included within the color LUT represents a palette of color values. The palette may also be considered an indexed palette in view of the respective reference entries.

Based on the color LUT, to every dot of the basic or customized image layout a specific reference entry regarding a palette of color values may be assigned. Therefore, the respective image layout to be printed may be considered to represent a palletized image with reference to the respective palette of color values. In some applications, for example, the reference entries may represent specific mixing ratios of printing inks to be used in view of a respective dot of the respective image layout since a specific color value is determined based on the respective mixing ratio. This is in contrast known procedures where each dot is assigned a specific absolute color value, like an RGB- or CMYK-scale based value. As a consequence, the data handling expenses are strongly reduced in view of the presently applied reference entries (mapping policy) and the palette of color values.

Notably, the present method is expenses-resistant with regard to an increase of the color depth of the available palette of color values based on the reference entries establishing a mapping policy. The expenses-resistance is provided through the possibility to work on the palette of color values or the reference entries (mapping policy). This is in contrast to known methods where RGB- or CMYK-scale based values are stored with every dot, since the data handling expenses enhance in such cases.

Since to each dot of the plurality of dots of the basic image layout a respective reference entry is assigned, the amount of data required to specify the basic image layout is reduced compared to the configuration according to which the exact color value is stored within the data for each dot of the plurality of dots. The reduction of the size of the data is caused by the underlying palette of color values of the color LUT. The color LUT provides the possibility to reduce the overall number of colors which are usable for the customized image layouts compared to an entire color palette, such as the CMYK main color palette. Since the resolution of the basic image layout and the customized image layouts is limited, there is a low probability to include all colors of such a main color palette within the specific customized image layout anyhow. Spoken differently, the number of dots of the plurality of dots included within the customized image layout is smaller than the number of colors included within such a main color palette. Therefore, limited color palettes may be used such that a size reduction of the data is achieved. In addition, the ability to recognize color differences by the naked human eye at daylight is limited. Consequently, the color palette may be further limited by omitting color values which are so close to each other that the naked human eye is not able to recognize the color difference. Thereby, a further size reduction of the underlying data of the customized image layout can be achieved since the color LUT contains only a reduced number of color values. Accordingly, also the number of reference entries can be reduced.

Using color LUTs also enables a simple way to adapt for at least one dot of the plurality of dots the color value since only the information specifying the respective reference entry of the color LUT has to be adapted. In contrast, if the entire information specifying the specific color value would be stored with each customized image layout for each dot, the amount of data would be strongly enlarged.

Within the present context, the at least one printer device may be considered an industrial printer device, also called professional printer device. In other words, the printer device may be configured to execute professional printing services.

Within the present context, the predefined printing speed may be considered a property of the printer device used to print the customized image layouts. The predefined printing speed may correspond to the minimum printing speed. In this regard, the minimum printing speed refers to a printing speed which is desired to be maintained by the operator to optimize the printing efficiency. The printing speed specifies a length of a medium (such as paper) which is printed per specified time unit.

The method described hereinabove is configured such that the predefined printing speed of the printer device can be maintained independent from an adaption of one or multiple dots of the plurality of dots of the basic image layout to obtain different customized image layouts. Moreover, the predefined printing speed of the printer device can also be maintained in view of the decompressing processes performed by the GPGPU.

In other words, the predefined printing speed of the printer device can also be maintained in view of subsequent executions of the method described hereinabove. That means, even if the basic image layout is changed, the GPGPU is able to perform the decompressing processes at sufficient speeds such that the printing process is not interrupted. Key aspects are the reduction of the data size of the underlying customized image layouts. This data reduction is achieved for example by not storing specific color values for each dot with the customized image layout but storing respective reference entries to a color LUT instead. A further key aspect is the usage of GPGPUs instead of traditional CPUs since a GPGPU provides for parallelized data processing which cannot be achieved by traditional CPUs to the same extent.

Optionally, printing of at least the decompressed first customized image layout may also be performed at the predefined printing speed.

In some embodiments, steps F) to H) are repeatedly performed such that a plurality of different decompressed customized image layouts are printed at the predefined printing speed. In other words, the basic image layout can be continuously modified to obtain several different customized image layouts which may be subsequently printed using the printer device. However, the predefined printing speed can be maintained without any interruption. Accordingly, an optimum printing efficiency is obtained.

Preferably, in step B) the decompressed data corresponding to the basic image layout are stored in at least one memory assigned to the at least one GPGPU. Steps C) and F) are performed on the decompressed data stored in the at least one memory assigned to the at least one GPGPU. The GPGPU is generally configured for parallelized data processing. Accordingly, memory devices assigned to the GPGPU are specialized in that they have writing and reading speeds such that parallelized data processing may be performed without interruption. Therefore, if the decompressing processes are performed within the memory assigned to the GPGPU, subsequent steps of adapting color values of dots of the plurality of dots of the basic image layout may be performed with regard to the same memory as well. Consequently, common memory devices may be avoided. Hence, the speed during the decompressing processes and the processing processes for adapting the color values of the dots is improved compared to a configuration of using common memory devices.

Optionally, in step F) the color value is adapted based at least on assigning a different reference entry of the plurality of reference entries of the color LUT to the at least one dot or based on a modification of the palette of color values included in the color LUT. Accordingly, obtaining a different decompressed customized image layout may be achieved in two alternative ways. Either the reference entry for a specific dot is adapted or the LUT is modified with regard to the palette of color values stored therein. Since the palette of color values stored within the LUT comprises only a reduced number of color values compared to a main color palette (such a CYMK), working on the palette of color values contained within the LUT causes reduced processing expenses. Therefore, the overall speed of adapting the color values of the dots is improved. In the alternative case, by adapting the reference entry for a specific dot the amount of data of the underlying decompressed customized image layout can be kept low. Thus, the overall speed of the adapting process can be improved as well.

In some embodiments, in steps C) and F) at least one additional data modification operation is performed to obtain the respective decompressed customized image layout. The at least one additional data modification operation comprises at least one of a screening operation, an ink coverage uniformity operation, a vectorial modification operation, a color correction operation, and a bad jet compensation operation. Thus, the decompressed customized image layout can be obtained such that for example external degradations occurring with regard to the printer device can be compensated for. During the lifetime of a printer device, the printer jet may degrade such that a specific color value is not correctly printed anymore. Therefore, the palette of color values stored within the color LUT can be appropriately adapted to adjust the color values accordingly. In an alternative, across the printing width of the medium which is printed the ink coverage uniformity may vary. Therefore, depending on the relative position of the dot within the decompressed customized image layout, the color value may be appropriately adjusted. In addition, the adaption may also comprise a modification of graphical features to be printed between different decompressed customized image layouts.

To perform the additional data modification operation as well as to perform the adaption of the color value of the at least one dot of the plurality of dots of the basic image layout a secondary information may be used. The secondary information may comprise respective information and specify how a color value of a specific dot is to be adapted or how an additional data modification is to be performed. Optionally the secondary information may be stored within the same memory in which the decompressed data corresponding to the basic image layout is stored. In particular, the secondary information may be stored within a memory assigned to the at least one GPGPU.

Preferably, the memory assigned to the at least one GPGPU may comprise a volatile and/or preferably non-volatile memory. According to one exemplary embodiment at least one non-volatile memory (through NVMe protocol) is assigned. The advantage of the NVMe protocol s is, that they show very short access times as well as a high writing and reading speeds. Accordingly, NVMe protocols are well-suited to be used with GPGPUs to optimize data processing.

In some embodiments, the data compression ratio of the compressed data is larger than 3 and up to 20, preferably larger than 5, more preferably the data compression ratio substantially corresponds to 10. Accordingly, a data compression algorithm may be used which strongly decreases the size of the data set compressed data. Therefore, communication and/or storage infrastructures which are used for providing the data set of compressed data may be charged with less communication traffic expenses.

Optionally, the data compression algorithm may be an open-source algorithm. Exemplarily, an LZ4 type compression algorithm may be applied in this regard.

In specific embodiments, in step B) decompressing the data set of compressed data is performed in a parallelized fashion. Several portions of the data set of compressed data are simultaneously decompressed using the at least one GPGPU. In other words, the data set of compressed data may be accessed simultaneously at multiple different portions thereof. Accordingly, the multiple different portions may be simultaneously decompressed using the GPGPU. The parallelized decompressing procedure guarantees high decompressing speeds. Hence, the decompressing is such that an interruption of the printing procedures printed device can be avoided. In particular, the simultaneous decompressing of several portions of the data set of compressed data allows the queue of the controller assigned to the NVMe protocol coupled to the GPGPU to be filled such that the respective reading speed is improved. Moreover, the high decompressing speeds guarantee that sufficient bandwidth is achieved to uphold the predefined minimum printing speed. In this regard, the reduction of the data size supports the aspect of sufficient bandwidth. Here, bandwidth refers to a data transfer rate which is required to uphold the printing process at the desired quality, i.e. at the desired resolution.

Preferably, in steps C) and F) obtaining the respective decompressed customized image layout is performed in a parallelized fashion. Several portions of the respective decompressed customized image layout are simultaneously assigned the respective color value based on the respective reference entry of the color LUT. In particular, the GPGPU may be applied in this regard. Hence, the decompressed data corresponding to the basic image layout can be simultaneously adapted with regard to separate dots of the plurality of dots. The simultaneous processing is provided by the GPGPU and ensures that the printing speeds can be kept high and that the printing can be performed uninterrupted. Again, the simultaneous processing of several portions of the decompressed customized image layout allows the queue of the controller assigned to the NVMe coupled to the GPGPU to be filled such that the respective reading speed is improved. In this regard, it is advantageous if the decompressed data is stored within a specific memory assigned to the GPGPU since such a memory is specifically configured for parallelized processing of the data.

Optionally, a resolution of the basic image layout is larger than 150 dpi and up to 2400 dpi, preferably larger than 600 dpi, more preferably the resolution is substantially 1200 dpi. In other words, the decompressed customized image layouts can comprise high-resolution image layouts.

Preferably, step B) is performed at a decompressing speed. The decompressing speed substantially corresponds to the minimum printing speed. Thereby, it is ensured that the decompression procedures do not decelerate the printing procedure. Interruptions of the printing procedure may thus be avoided.

Optionally, the data of the data set of compressed data are provided in step A) from at least one NVMe protocol. Therefore, even if the method as described hereinabove is executed several times subsequent to each other, providing the underlying compressed data of the basic image layout does not influence the achievable printing speed since the NVMe protocol advantageously shows short access times and large writing and reading speeds. In essence, the overall method is thus configured for optimum printing speeds.

In some embodiments, the data of the data set of compressed data are provided at a predefined reading speed. The predefined reading speed is equal to or larger than the predefined minimum printing speed. In this case, it is guaranteed that providing the compressed data does not slow down the achievable printing speed.

Optionally, in steps D) and G) a network bus device coupled to the at least one GPGPU and the at least one printer device is used for providing the respective decompressed customized image layouts. Since several measures are taken to reduce the data size of the decompressed data of the decompressed customized image layouts, the network bus device applied for communicating between the GPGPU and the at least one printer device is advantageously charged with reduced network traffic. In other words, the load on the network bus device is reduced based on the several measures taken to reduce the data size required for printing.

Preferably, the color LUT comprises at least four, preferably six different main colors (Cyan, Magenta, Yellow, Black, Orange, Green). More preferably, wherein the color LUT comprises additional superposed colors each comprising fractions of at least two of the six main colors. Industrial printer devices, using six different main colors assists in better defining the main colors themselves and mixtures thereof. Accordingly, high quality printed media may be obtained.

In some embodiments, the method as described hereinabove is performed computer-implemented. Hence, respective circuitry may be applied to perform the method.

All features and embodiments disclosed with respect to any aspect of the present disclosure are combinable alone or in (sub-)combination with any one of the remaining aspects of the present disclosure including each of the preferred embodiments thereof, provided the resulting combination of features is reasonable to a person skilled in the art.

DESCRIPTION OF THE DRAWINGS

The forgoing aspects and further advantages of the claimed subject matter will become more readily appreciated as the same become better understood by reference to the following detailed description when taken in conjunction with the accompanying drawings. In the drawings, FIG. 1 is a schematic drawing of a method for variable data printing.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

All of the features disclosed hereinafter with respect to the example embodiments and/or the accompanying FIGURES can alone or in any sub-combination be combined with features of the aspects of the present disclosure including features of preferred embodiments thereof, provided the resulting feature combination is reasonable to a person skilled in the art.

For the purposes of the present disclosure, the phrase "at least one of A, B, and C", for example, means (A), (B), (C), (A and B), (A and C), (B and C), or (A, B, and C), including all further possible permutations when greater than three elements are listed. In other words, the term "at least one of A and B" generally means "A and/or B", namely "A" alone, "B" alone or "A and B".

FIG. 1 is a schematic drawing of a method 10 for variable data printing. Optional steps or features of the method 10 are depicted using dashed lines.

In step 12, a data set of compressed data is provided. The data set corresponds to a basic image layout. The basic image layout comprises a plurality of dots. The data set is usually provided using a database stored within a memory configured for providing the respective data set.

Optionally, the basic image layout is characterized by a specific image resolution. In the present embodiment, the basic image layout comprises a resolution of substantially 1200 dpi (dots per inch). The data set is thus suited for professional (industrial) printing services.

In step 14, using at least one GPGPU, the compressed data is decompressed to obtain decompressed data corresponding to the basic image layout.

The compressed data is characterized by a data compression ratio. The data compression ratio provides a measure with regard to the size reduction between the decompressed data and the compressed data. Within the present embodiment, the data compression ratio substantially corresponds to 10. The data compression provides the ability to reduce the data size to be handled. Therefore, the processing efficiency may be improved.

Optionally the decompressing procedure may be performed in a parallelized fashion. This means that several portions of the compressed data are simultaneously decompressed which enables the decompressing speed to be improved. The parallelized fashion is guaranteed by the infrastructure of the GPGPU which comprises several cores for simultaneous data processing.

In step 16, to each dot of the plurality of dots of the basic image layout a color value is assigned based on a reference entry of a plurality of reference entries of a color LUT such that a decompressed first customized image layout to be printed is obtained. Each reference entry of the color LUT corresponds to a color value of a palette of color values to be used. The color LUT provides the ability to use only a reduced number of color values in view of the customized image layout since certain color differences may anyhow not be recognized by the naked human eye at daylight and since the resolution of the customized image layout is anyhow too small for all color values of a main color palette (CYMK) to be used. Since the number of color values contained within the palette of color values of the color LUT is reduced compared to main color palettes (CYMK) an additional reduction of the data size is achieved. Accordingly, the processing efficiency of the method is further improved.

Preferably, in view of step 16 the GPGPU is applied as well. In other words, for several dots of the basic image layout color values are assigned simultaneously in view of the ability of the GPGPU to perform data processing in a parallelized fashion.

Optionally, the color LUT comprises six main color values and several superposed color values each being mixed of at least two of the six main color values.

In step 18, the decompressed first customized image layout is provided to at least one printer device. In this regard, a bus device connecting the GPGPU and the at least one printer device may be configured for the respective data transmission.

In step 20, at least the decompressed first customized image layout is printed. Preferably, printing of the first customized image layout is performed by means of the at least one printer device.

Optionally, the at least one printer device is an industrial (professional) printer device for professional printing services.

In step 22, for at least one dot of the plurality of dots of the basic image layout the color value is adapted to obtain at least one additional decompressed customized image layout to be printed. Generally, the additional decompressed customized image layout is different from the first decompressed customized image layout obtained in step 16. Several differences may occur. For example, portions of the customized image layouts may distinguish from each other with regard to a color or a graphical feature. The modification of specific portions of the customized image layouts in view of step 16 and 22 provide the ability for VDP since the data of the customized image layouts distinguish from each other at least with regard to the at least one dot for which the color value is changed.

Optionally, the adaption of the color value of the at least one dot can be achieved by assigning a different reference entry to the at least one dot in question. Accordingly, for this dot a different color value of the color LUT is used.

In an alternative, the reference entry for the at least one dot may maintain. However, the palette of color values of the color LUT may be processed so as to be modified in view of the color LUT used with regard to step 16. In essence, in this case in steps 16 and 22 different color LUTs are applied. Even if the reference entry of the at least one dot in question remains the same, the modification of the color LUT causes a difference of the color value used for the at least one dot.

Preferably, in view of step 22 a GPGPU is applied as well. In other words, for several dots of the basic image layout color values are adapted simultaneously in view of the ability of the GPGPU to perform data processing in a parallelized fashion.

In step 24, the at least one additional decompressed customized image layout is provided to the at least one printer device.

In step 26, the at least one additional decompressed customized image layout is printed at a predefined printing speed. The at least one printer device continuously prints subsequent decompressed customized image layouts at a predefined minimum printing speed. Within the present embodiment, the predefined minimum printing speed substantially is larger than 20 m/min, more preferably the minimum printing speed being substantially at least 100 m/min. In other words, the medium to be printed (e.g. paper) is driven through the printer device at the speed of at least 100 m/min and continuously printed along the way.

Within the present embodiment, the method 10 is configured such that no interruption of the printing procedure is caused. This means, that in view of the subsequent printing steps 20 and 26 the steps in between, namely steps 22 and 24, are performed at such speeds that no interruption of the printing procedure is caused. This is achieved by a data size reduction as described hereinabove as well as by applying a GPGPU infrastructure which allows parallelized data processing to be executed.

In addition, the predefined minimum printing speed can also be maintained in view of several repetitions of the method 10. In other words, the decompressing procedure is performed at a decompressing speed. This decompressing speed is sufficient for the predefined minimum printing speed to be guaranteed. The GPGPU provides for sufficient decompressing speed such that the predefined minimum printing speed may be maintained if the method 10 is repeated.

Optionally, steps 22, 24, and 26 may be repeated within the method 10 to obtain several different customized image layouts. This is indicated by arrow 28. Therefore, each execution of the method 10 may result in a plurality of several different customized image layouts according to VDP.

As another option, the compressed data may be provided in step 12 from a NVMe protocol according to sub step 30. The NVMe protocol is characterized by a specific reading speed. The reading speed of a NVMe protocol may be such large, that the predefined minimum printing speed is guaranteed. In particular, within the present embodiment the reading speed of the NVMe protocol is even larger than the predefined minimum printing speed.

As another option, according to sub step 32, a NVMe protocol may be coupled to the GPGPU used in step 14. In other words, the NVMe protocol may be assigned to the GPGPU. Due to their high writing and reading speeds, NVMe protocols may be configured such that sufficient decompressing speeds and parallelized data processing procedures are achieved to guarantee that the predefined minimum printing speed is maintained. This means that the decompressing procedures of the compressed data may be performed in view of the NVMe protocol coupled to the GPGPU.

Optionally, the decompressed data may subsequently be stored within the NVMe protocol. Therefore, assigning to each dot a reference entry according to step 16 and adapting the color value of at least one dot in step 22 may also be performed in view of the decompressed data stored within the NVMe protocolcoupled to the GPGPU. Accordingly, no additional common and, therefore, slower memory devices are needed since all processing steps are performed on the data being stored within the NVMe protocol coupled to the GPGPU.

According to another option, sub step 34 is applied in at least one or both of steps 16 and 22 such that at least one additional data modification is performed to obtain the respective decompressed customized image layout. Accordingly, additional data modification operations may be performed to improve the printing result in view of the decompressed customized image layouts. For example, at least one of a screening operation, an ink coverage uniformity operation, a vectorial modification operation, a color correction operation, and a bad jet compensation operation may be applied. Hence, the decompressed customized image layout can be tailored if for example a jet of the printer device is degraded.

Certain embodiments disclosed herein, particularly the respective module(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a general purpose computation on graphics processing unit (GPGPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

Although the disclosure has been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

The invention claimed is:

1. A method for variable data printing, the method-comprising:
providing a data set of compressed data, wherein the data set corresponds to a basic image layout, wherein the basic image layout comprises a plurality of dots,
decompressing, using at least one general purpose computation on graphics processing unit, the compressed data to obtain decompressed data corresponding to the basic image layout,
assigning, to each dot of the plurality of dots of the basic image layout, a color value based on a reference entry of a plurality of reference entries of a color lookup table, such that a decompressed first customized image layout to be printed is obtained, wherein each reference entry of the color lookup table corresponds to a color value of a palette of color values to be used,
providing the decompressed first customized image layout to at least one printer device, printing at least the decompressed first customized image layout, adapting, for at least one dot of the plurality of dots of the basic image layout, the color value to obtain at least one additional decompressed customized image layout to be printed, providing the at least one additional decompressed customized image layout to the at least one printer device, and printing the at least one additional decompressed customized image layout at a predefined printing speed, wherein the at least one printer device continuously prints subsequent decompressed customized image layouts at a predefined minimum printing speed, wherein the minimum printing speed is larger than 20 m/min, preferably the minimum printing speed being at least 40 m/min, more preferably the minimum printing speed being at least 60 m/min, more preferably the minimum printing speed being at least 100 m/min.

2. The method of claim 1, wherein the adapting, the providing the at least one additional decompressed customized image layout, and the printing the at least one additional decompressed customized image layout are repeatedly performed such that a plurality of different decompressed customized image layouts are printed at the predefined printing speed.

3. The method of claim 1, wherein the decompressing further includes storing the decompressed data corresponding to the basic image layout in at least one memory assigned to the general purpose computation on graphics processing unit (GPGPU), and wherein the assigning and the adapting are performed on the decompressed data stored in the at least one memory assigned to the general purpose computation on graphics processing unit (GPGPU).

4. The method of claim 1, wherein the adapting the color value is based at least on assigning a different reference entry of the plurality of reference entries of the color lookup table to the at least one dot or based on a modification of the palette of color values included in the color lookup table.

5. The method of claim 1, wherein the assigning and the adapting include performing at least one additional data modification operation is to obtain the respective decompressed customized image layout, wherein the at least one additional data modification operation comprises at least one of a screening operation, an ink coverage uniformity operation, a vectorial modification operation, a color correction operation, and a bad jet compensation operation.

6. The method of claim 1, wherein a data compression ratio of the compressed data is larger than three and up to 20, preferably larger than 5, more preferably the data compression ratio substantially corresponds to 10.

7. The method of claim 1, wherein the decompressing the data set of compressed data is performed in a parallelized fashion, wherein several portions of the data set of compressed data are simultaneously decompressed using the at least one general purpose computation on graphics processing unit.

8. The method of claim 1, wherein the assigning and the adapting include obtaining the respective decompressed customized image layout in a parallelized fashion, wherein several portions of the respective decompressed customized image layout are simultaneously assigned the respective color value based on the respective reference entry of the color lookup table.

9. The method of claim 1, wherein a resolution of the basic image layout is larger than 300 dpi and up to 2400 dpi, preferably larger than 600 dpi, more preferably the resolution is substantially 1200 dpi.

10. The method of claim 1, wherein the decompressing is performed at a decompressing speed, and wherein the decompressing speed substantially corresponds to the minimum printing speed.

11. The method of claim 1, wherein the data of the data set of compressed data is provided from at least one non-volatile memory express (e.g. NVMe protocol).

12. The method of claim 1, wherein the providing the decompressed first customized image layout and the providing the at least one additional decompressed customized image layout include using a network bus device coupled to the at least one general purpose computation on graphics processing unit (GPGPU) and the at least one printer device for providing the respective decompressed customized image layouts.

13. The method of claim 1, wherein the color lookup table comprises at least four, more preferably at least six different main colors (Cyan, Magenta, Yellow, Black, Orange, Green), preferably wherein the color lookup table comprises additional superposed colors each comprising fractions of at least two of the six main colors.

* * * * *

UNITED STATES PATENT AND TRADEMARK OFFICE
CERTIFICATE OF CORRECTION

PATENT NO. : 11,907,596 B1
APPLICATION NO. : 18/337599
DATED : February 20, 2024
INVENTOR(S) : Gregory Gascon Page 1 of 1

It is certified that error appears in the above-identified patent and that said Letters Patent is hereby corrected as shown below:

On the Title Page

Column 1, Line 2, below "(22) Filed: Jun. 20, 2023" insert --(30) Foreign Application Priority Data Jun. 21, 2022 (EP) 22180077--.

In the Claims

In Claim 1, Column 12, Lines 50-51, delete "method-comprising" and insert --method comprising--.

In Claim 5, Column 13, Line 43, after "operation" delete "is".

Signed and Sealed this
Twenty-third Day of April, 2024

Katherine Kelly Vidal
*Director of the United States Patent and Trademark Office*